United States Patent
Lugo-Castillo et al.

(10) Patent No.: US 10,184,380 B2
(45) Date of Patent: Jan. 22, 2019

(54) USE OF PRESSURE DIFFERENTIAL IN SELECTIVE CATALYTIC REDUCTION SYSTEMS

(71) Applicant: Cummins Emission Solutions Inc., Columbus, IN (US)

(72) Inventors: Jaime A. Lugo-Castillo, Columbus, IN (US); Alex D. Harrington, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 397 days.

(21) Appl. No.: 14/955,465

(22) Filed: Dec. 1, 2015

(65) Prior Publication Data
US 2017/0152785 A1    Jun. 1, 2017

(51) Int. Cl.
F01N 11/00 (2006.01)
F01N 3/08 (2006.01)
F01N 3/20 (2006.01)

(52) U.S. Cl.
CPC .......... *F01N 11/002* (2013.01); *F01N 3/0821* (2013.01); *F01N 3/0842* (2013.01); *F01N 3/206* (2013.01); *F01N 3/2066* (2013.01); *F01N 2560/08* (2013.01); *F01N 2560/14* (2013.01); *F01N 2610/02* (2013.01); *F01N 2900/0412* (2013.01); *F01N 2900/1406* (2013.01); *Y02T 10/24* (2013.01); *Y02T 10/47* (2013.01)

(58) Field of Classification Search
CPC .... F01N 11/002; F01N 3/0321; F01N 3/2066; F01N 3/2088; G05B 19/416
See application file for complete search history.

(56) References Cited

U.S. PATENT DOCUMENTS

| 8,171,724 | B2 | 5/2012 | Xu et al. |
| 2011/0219747 | A1 | 9/2011 | Geveci et al. |
| 2012/0004863 | A1* | 1/2012 | Ardanese ............... F01N 9/002 702/47 |
| 2012/0210700 | A1 | 8/2012 | Sisken et al. |
| 2012/0233986 | A1 | 9/2012 | Geveci et al. |
| 2014/0298775 | A1 | 10/2014 | Snopko et al. |

(Continued)

OTHER PUBLICATIONS

International Search Report and Written Opinion issued for PCT/US2016/063022, dated Feb. 3, 2017, 7 pages.

*Primary Examiner* — Phuc T Dang
(74) *Attorney, Agent, or Firm* — Foley & Lardner LLP (57) ABSTRACT

Systems and methods to determine the pressure differential for selective catalytic reduction systems includes a first sensor coupled to an inlet of a selective catalytic reduction system, a second sensor coupled to an outlet of the selective catalytic reduction system, and a controller communicatively coupled to the selective catalytic reduction system. The controller is configured to interpret a first parameter indicative of a first pressure amount of the selective catalytic reduction system measured by the first sensor, interpret a secondary parameter indicative of a secondary pressure amount of the selective catalytic reduction system measured by the second sensor, determine a plurality of operating parameters based, at least in part, on the interpretation of the first parameter and the secondary parameter, and generate a selective catalytic reduction command based, at least in part, on the determination of the plurality of operating parameters.

22 Claims, 6 Drawing Sheets

(56) References Cited

U.S. PATENT DOCUMENTS

| | | | |
|---|---|---|---|
| 2014/0371054 A1* | 12/2014 | Whitt | B01J 38/00 |
| | | | 502/20 |
| 2015/0059317 A1* | 3/2015 | Mital | F01N 3/208 |
| | | | 60/274 |
| 2015/0159466 A1* | 6/2015 | Themig | E21B 33/14 |
| | | | 166/285 |
| 2017/0022927 A1* | 1/2017 | Sanborn | F02M 59/20 |
| 2017/0107924 A1* | 4/2017 | Blythe | F02D 41/0085 |

\* cited by examiner

USE OF PRESSURE DIFFERENTIAL IN SELECTIVE CATALYTIC REDUCTION SYSTEMS

TECHNICAL FIELD

The present application relates generally to the field of exhaust aftertreatment systems. More particularly, the present application relates to systems and methods for monitoring pressure in an exhaust aftertreatment system.

BACKGROUND

For internal combustion engines, such as diesel engines, nitrogen oxide ($NO_x$) compounds may be emitted in the exhaust. To reduce $NO_x$ emissions, a selective catalytic reduction (SCR) process may be implemented to convert the $NO_x$ compounds into more neutral compounds, such as diatomic nitrogen, water, or carbon dioxide, with the aid of a catalyst and a reductant. The catalyst may be included in a catalyst chamber of an exhaust aftertreatment system, such as that of a vehicle or power generation unit. A reductant, such as anhydrous ammonia, aqueous ammonia, or urea, is typically introduced into the exhaust gas flow prior to the catalyst chamber. To introduce the reductant into the exhaust gas flow for the SCR process, an SCR system may dose or otherwise introduce the reductant through a dosing circuit that vaporizes or sprays the reductant into an exhaust pipe of the exhaust aftertreatment system upstream of the catalyst chamber.

SUMMARY

One implementation relates to a system for improving the determination of a pressure differential or a selective catalytic reduction system. The system includes a first sensor coupled to an inlet of a selective catalytic reduction system, a second sensor coupled to an outlet of the selective catalytic reduction system, and a controller communicatively coupled to the selective catalytic reduction system. The controller is configured to interpret a first parameter indicative of a first pressure amount of the selective catalytic reduction system measured by the first sensor, interpret a secondary parameter indicative of a secondary pressure amount of the selective catalytic reduction system measured by the second sensor, determine a plurality of operating parameters based, at least in part, on the interpretation of the first parameter and the secondary parameter, and generate a selective catalytic reduction command based, at least in part, on the determination of the plurality of operating parameters.

Another implementation relates to a system for improving a pressure differential determination for a selective catalytic reduction system. The system includes a plurality of selective catalytic reduction systems. Each of the plurality of selective catalytic reduction systems includes a first sensor coupled to an inlet of the respective selective catalytic reduction system, and a second sensor coupled to an outlet of the respective selective catalytic reduction system; and a controller communicatively coupled to the plurality of selective catalytic reduction systems, the controller configured to: for each catalytic reduction system, interpret a first parameter indicative of a pressure amount of the respective selective catalytic reduction system measured by the first sensor; interpret a secondary parameter indicative of a secondary pressure amount of the respective selective catalytic reduction system measured by the second sensor; determine a plurality of operating parameters based, at least in part, on the interpretation of the first parameter and the secondary parameter; and generate a plurality of selective catalytic reduction commands based, at least in part, on the determination of the plurality of operating parameters.

Another implementation relates to a method for improving a pressure differential determination corresponding to a selective catalytic reduction system. The method includes interpreting, via a controller, a first parameter indicative of a first pressure amount of the selective catalytic reduction system measured by a first sensor; interpreting, via the controller, a secondary parameter indicative of a secondary pressure amount of the selective catalytic reduction system measured by a second sensor; determining, via the controller, the plurality of operating parameters based, at least in part, on the interpretation of the first parameter and the secondary parameter; and generating, via the controller, a selective catalytic reduction command based, at least in part, on the determination of the plurality of operating parameters, the selective catalytic reduction command causing an indication of the pressure differential corresponding to the selective catalytic reduction system.

Yet a further implementation relates to a non-transitory computer-readable medium storing instructions that, when executed by one or more processors, cause the one or more processors to perform several operations. The operations include interpreting a first parameter indicative of a first pressure amount of the selective catalytic reduction system measured by a first sensor; interpreting a secondary parameter indicative of a secondary pressure amount of the selective catalytic reduction system measured by a second sensor; determining a plurality of operating parameters based, at least in part, on the interpretation of the first parameter and the secondary parameter; and generating a selective catalytic reduction command based, at least in part, on the determination of the plurality of operating parameters, the selective catalytic reduction command causing an indication of the pressure differential corresponding to the selective catalytic reduction system.

These and other features of the implementations described herein, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

I. Overview

Below is a detailed description of various concepts related to, and implementations of, methods, apparatuses, and systems for monitoring pressure associated with SCR systems included in an aftertreatment system. The various concepts introduced above and discussed in greater detail below may be implemented in any of numerous ways, as the described concepts are not limited to any particular manner of implementation. Examples of specific implementations and applications are provided primarily for illustrative purposes.

Referring to the Figures generally, the various embodiments disclosed herein relate to a system and method for improving a pressure differential determination for a selective catalytic reduction system. According to the present disclosure, a controller interprets a first parameter indicative of a first pressure amount of the selective catalytic reduction system measured by the first sensor, interprets a secondary parameter indicative of a secondary pressure amount of the selective catalytic reduction system measured by the second sensor, determines a plurality of operating parameters based, at least in part, on the interpretation of the first parameter and the secondary parameter, and generates a selective catalytic reduction command based, at least in part, on the determination of the plurality of operating parameters.

Various conventional systems that monitor pressure associated with a selective catalytic reduction system utilize an approach by which the pressure sensor (e.g., a barometric sensor) disposed away from the aftertreatment system determines pressure across the selective catalytic reduction system. Other conventional systems may utilize an approach by which pressure differential sensors are used to determine the pressure via a set of tubes disposed before and after a diesel particulate filter (DPF), which can complicate the assembly of such aftertreatment systems as well as raise assembly and/or maintenance costs. Further, the amount of error introduced to the pressure differential sensor increases as the length of the tubes increase. Consequently, such approaches do not yield the desired determination of the pressure differential across a selective catalytic reduction system.

The conventional systems discussed above generally fail to take into consideration the need for a calibratible solution corresponding to one or a plurality of selective catalytic reduction systems. As a result, these systems tend to be inaccurate at determining the pressure differential for each respective selective catalytic reduction system.

Various embodiments disclosed herein include a system, method, and apparatus for improving a pressure differential determination for a selective catalytic reduction system which may provide benefits that include, for example, indicating SCR system blockage, excessive pressure, or a missing SCR system.

Below are detailed descriptions of various concepts related to, and embodiments of, methods, apparatuses, and systems for improving a pressure differential determination for a selective catalytic reduction system. The various concepts introduced above and discussed in greater detail below may be implemented in any of numerous ways, as the described concepts are not limited to any particular manner of implementation. Examples of specific implementations and applications are provided primarily for illustrative purposes.

II. Overview of Selective Catalytic Reduction System

Figure 1:
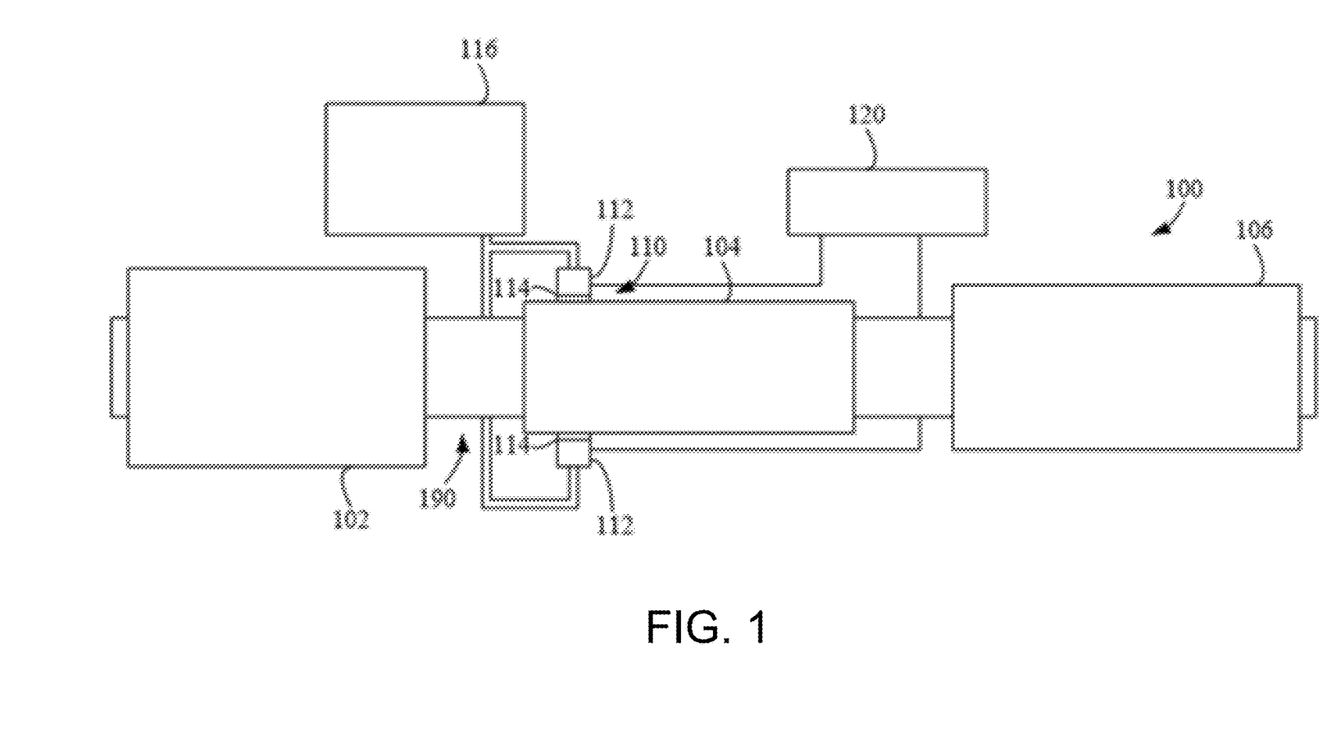
FIG. 1 is a schematic block diagram of an example selective catalytic reduction system having an example reductant delivery system for an exhaust aftertreatment system.

FIG. 1 depicts a selective catalytic reduction system 100 having an example reductant delivery system 110 for an exhaust aftertreatment system 190. The selective catalytic reduction system 100 includes a diesel particulate filter (DPF) 102, the reductant delivery system 110, a decomposition chamber or reactor 104, and a SCR catalyst 106.

The DPF 102 is configured to remove particulate matter, such as soot, from exhaust gas flowing in the exhaust aftertreatment system 190. The DPF 102 includes an inlet, where the exhaust gas is received, and an outlet, where the exhaust gas exits after having particulate matter substantially filtered from the exhaust gas and/or converting the particulate matter into carbon dioxide.

The decomposition chamber 104 is configured to convert a reductant, such as urea, aqueous ammonia, or diesel exhaust fluid (DEF) into ammonia. The decomposition chamber 104 includes a reductant delivery system 110 configured to dose the reductant into the decomposition chamber 104. In some implementations, the urea, aqueous ammonia, DEF is injected or otherwise inserted upstream of the SCR catalyst 106. The reductant droplets then undergo the processes of evaporation, thermolysis, and hydrolysis to form gaseous ammonia within the exhaust aftertreatment system 190. The decomposition chamber 104 includes an inlet in fluid communication with the DPF 102 to receive the exhaust gas containing $NO_x$ emissions and an outlet for the exhaust gas, $NO_x$ emissions, ammonia, and/or remaining reductant to flow to the SCR catalyst 106.

The SCR catalyst 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 106 includes inlet in fluid communication with the decomposition chamber 104 from which exhaust gas and reductant is received and an outlet.

The exhaust aftertreatment system 190 may further include a diesel oxidation catalyst (DOC) in fluid communication with the exhaust aftertreatment system 190 (e.g., downstream of the SCR catalyst 106, or upstream of the DPF 102) to oxidize hydrocarbons and carbon monoxide in the exhaust gas.

The decomposition chamber 104 includes the dosing circuit 112 mounted to the decomposition chamber 104 such that the dosing circuit 112 may dose a reductant, such as urea, aqueous ammonia, or DEF, into the exhaust gases flowing in the exhaust aftertreatment system 190. The dosing circuit 112 may include an insulator 114 interposed between a portion of the dosing circuit 112 and the portion of the decomposition chamber 104 to which the dosing circuit 112 is mounted. The dosing circuit 112 is fluidly coupled to one or more reductant sources 116. In some implementations, a pump (not shown) may be used to pressurize the reductant source 116 for delivery to the dosing circuit 112.

Figure 3:
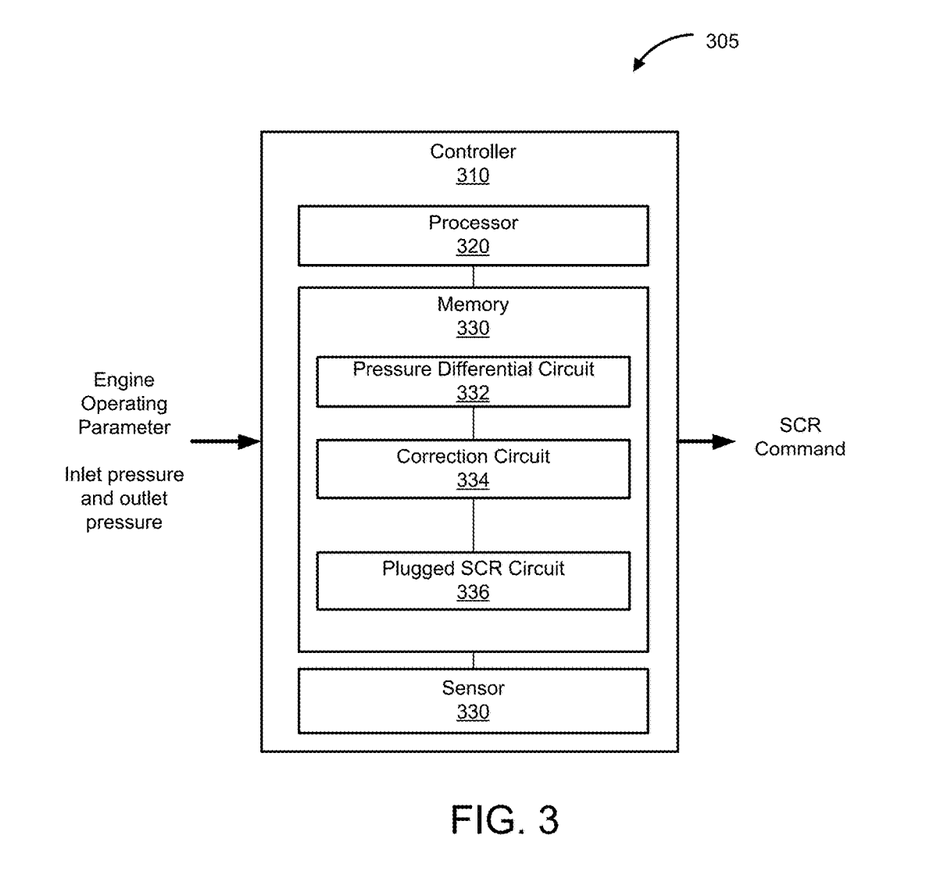
FIG. 3 is a schematic block diagram of a controller included in the aftertreatment system of FIG. 1, 2a, or 2b according to an example embodiment.
Figure 4:
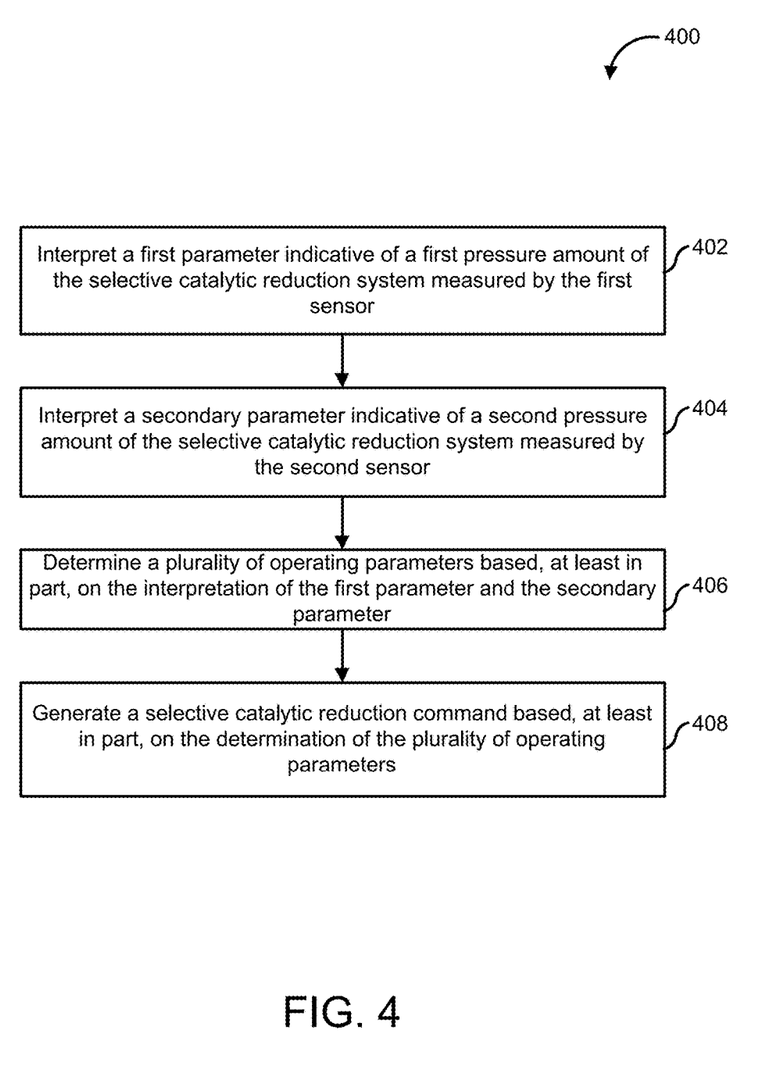
FIG. 4 is a schematic flow diagram of an example method of improving a pressure differential determination corresponding to a selective catalytic reduction system.
Figure 5:
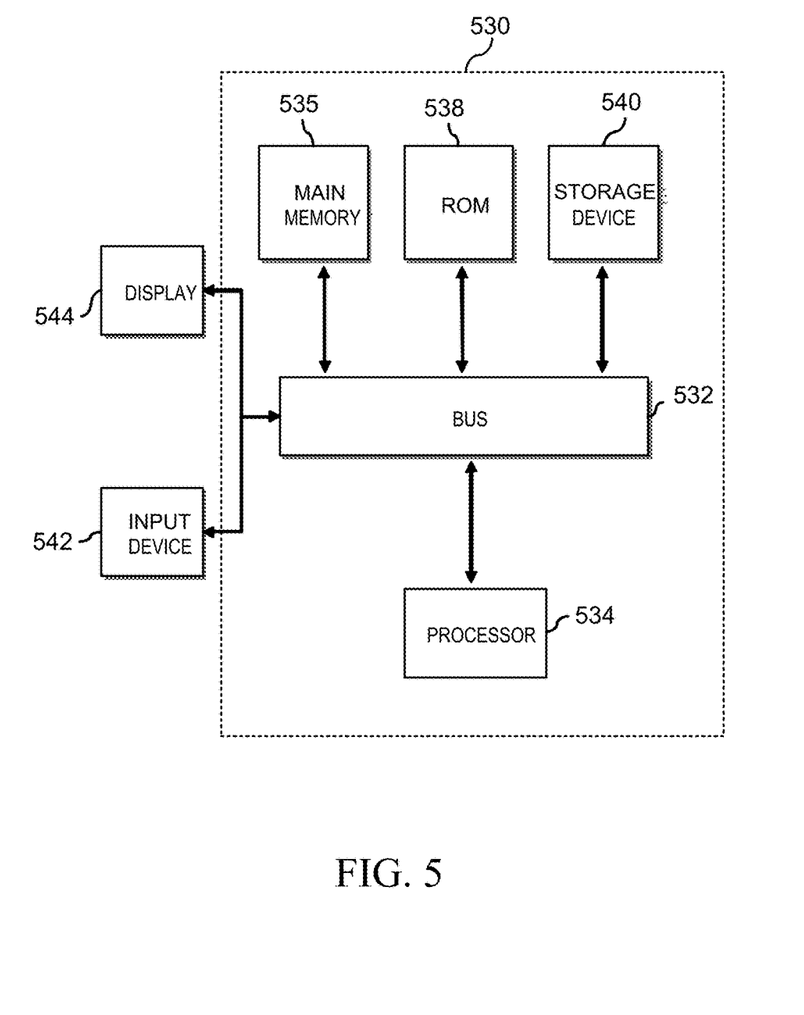
FIG. 5 is a schematic block diagram of an example computing device which can be used as a controller included in the aftertreatment systems of FIG. 1, 2a, or 2b.

The controller 120 is configured to perform certain operations, such as those described herein in relation to FIGS. 3-5.

In certain embodiments, the controller 120 forms a portion of a processing subsystem including one or more computing devices having memory, processing, and communication hardware. The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), erasable programmable read only memory (EPROM), flash memory, or any other suitable memory from which the controller 120 can read instructions. The instructions may include code from any suitable programming language. The controller 120 may be a single device or a distributed device, and the functions of the controller 120 may be performed by hardware and/or as computer instructions on a non-transient computer readable storage medium.

In certain embodiments, the controller 120 includes or is otherwise in communication with circuitry configured to functionally execute the operations of the controller 120. In further embodiments, the controller 120 may include a pressure differential circuit for performing the operations described in reference to FIGS. 3-5. The description herein including circuit emphasizes the structural independence of the aspects of the controller 120 and illustrates one grouping of operations and responsibilities of the controller 120. Other groupings that execute similar overall operations are understood within the scope of the present application. A circuit may be implemented in hardware and/or as computer instructions on a non-transient computer readable storage medium, and such circuits may be distributed across various hardware or computer based components. More specific descriptions of certain embodiments of controller operations are included in the section referencing FIGS. 3-5.

Example and non-limiting circuit implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the circuit specification, any actuator including at least an electrical, hydraulic, or pneumatic actuator, a solenoid, an op-amp, analog control elements (springs, filters, integrators, adders, dividers, gain elements), and/or digital control elements.

III. Example Configurations for Selective Catalytic Reduction System

Figure 2A:
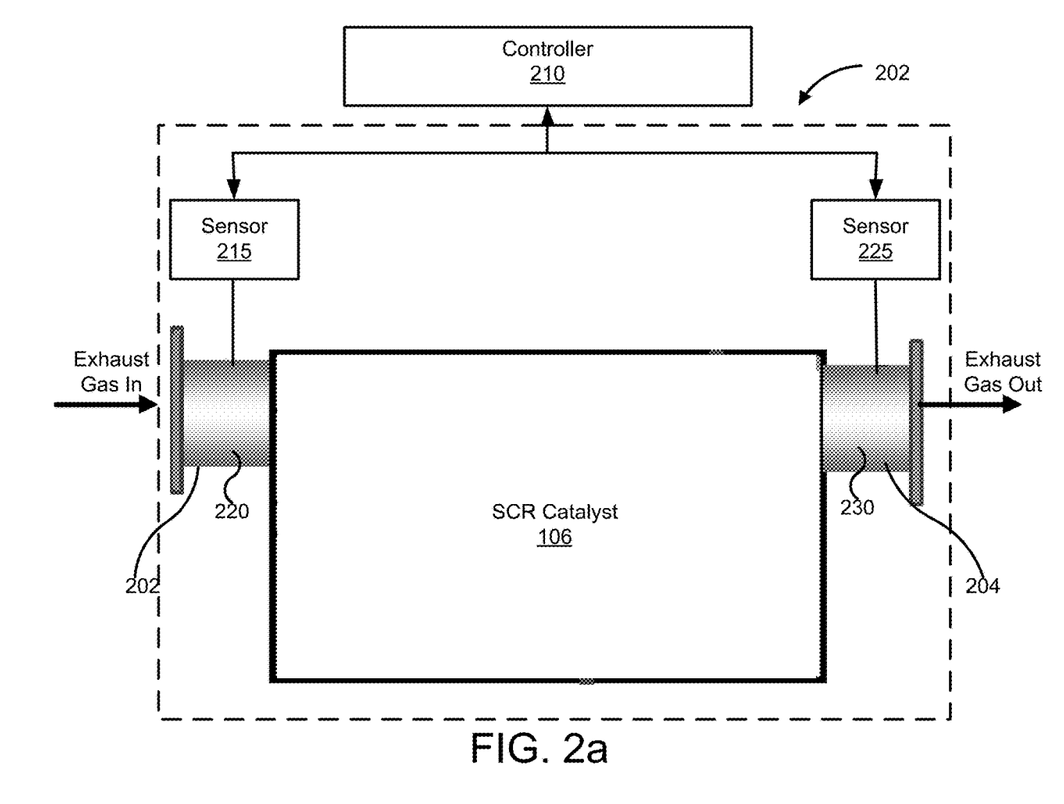
FIG. 2a is a schematic block diagram of a selective catalytic reduction system according to another example embodiment.

FIG. 2a depicts a schematic block diagram of a selective catalytic reduction system 202 for an aftertreatment system according to an example embodiment. The selective catalytic reduction system 202 may include an inlet 220 in fluid communication with the decomposition chamber 104 from which exhaust gas and reductant is received and an outlet 230. In the present example, a first sensor 215 is coupled to an inlet 220 of a selective catalytic reduction system 202. As depicted, a second sensor 225 is coupled to an outlet 230 of the selective catalytic reduction system 202. As shown in FIG. 2a, the first sensor 215 and the second sensor 225 are positioned opposite each other on a left side 202 and a right side 204 of the selective catalytic reduction system 202. In other implementations, the first sensor 215 and the second sensor 225 may be at other positions relative to each other. Accordingly, any other positioning of the first sensor 215 and the second sensor 225 about the selective catalytic reduction system 202 may be used. As shown, the first sensor 215 and the second sensor 225 may be communicatively coupled to the controller 210 as described herein with reference to FIGS. 3-5.

Figure 2B:
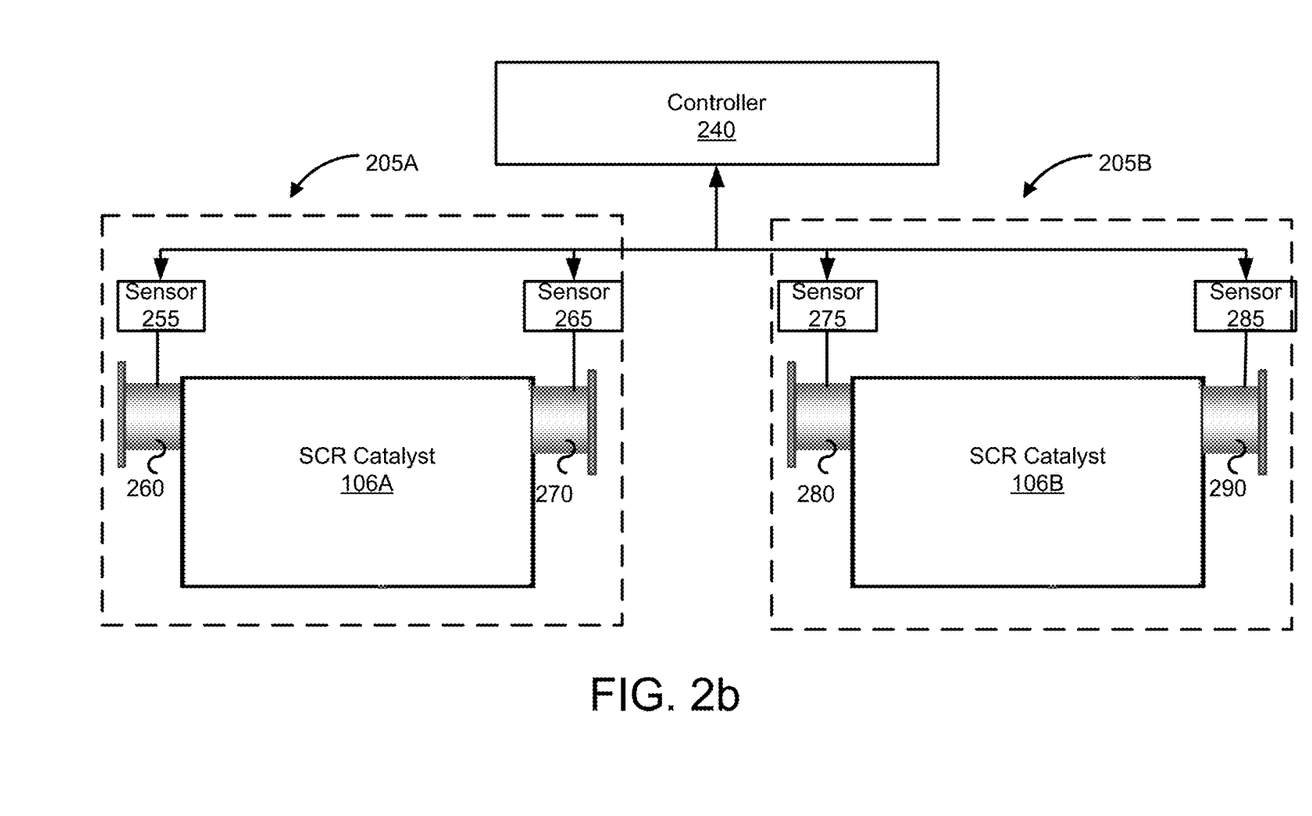
FIG. 2b is a schematic block diagram of a plurality of selective catalytic reduction systems according to an example embodiment.

FIG. 2b depicts a schematic block diagram of a plurality of selective catalytic reduction systems 205A, B according to an example embodiment. For example, a first selective catalytic reduction system (e.g., the selective catalytic reduction system 205A) positioned upstream of a second selective catalytic reduction system (e.g., selective catalytic reduction system 106B). In other embodiments, the first selective catalytic reduction system 205A and the second selective catalytic reduction system 205B can be positioned in a parallel arrangement. Each respective selective catalytic reduction systems 205A,205B may include a plurality of inlets 260, 280 in fluid communication with the decomposition chamber 104 from which exhaust gas and reductant is received and a plurality of outlets 270, 290. In some embodiments, a respective inlet (e.g., the inlet 280) may be in fluid communication with a respective outlet (e.g., the outlet 270) from which exhaust gas is received. In the present example, a first sensor 255, 275 is coupled to an inlet 260, 280 of the respective selective catalytic reduction system 205A, 205B. In some embodiments, a second sensor 265, 285 is coupled to an outlet 270, 290 of the respective selective catalytic reduction systems 205A, 205B. As shown in FIG. 2b, the first sensor 255, 275 and the second sensor 265, 285 may be communicatively coupled to the controller 240. Alternatively or additionally, the controller 240 may be communicatively coupled to the plurality of selective catalytic reduction systems as described herein with reference to FIGS. 3-5.

FIG. 3 is a schematic block diagram of a controller 310 included in the aftertreatment system according to an embodiment. The controller may be communicatively coupled to a selective catalytic reduction system (e.g. the selective catalytic reduction system 202). In some embodiments, the controller 310 may be communicatively coupled to a plurality of selective catalytic reduction systems (e.g., the selective catalytic reduction systems 205A,B). In the present embodiment, the controller 310 includes a processor 320, a memory 330 or other computer readable medium, and a sensor 330. It should be understood that the controller 310 of FIG. 3 depicts only one embodiment of the controller 310, and any other controller capable of performing the operations described herein can be used (e.g., the computing device 530).

The processor 320 can include a microprocessor, programmable logic controller (PLC) chip, an ASIC chip, or any other suitable processor. The processor 320 is in communication with the memory 330 and configured to execute instructions, algorithms, commands or otherwise programs stored in the memory 330.

The memory 330 includes any of the memory and/or storage components discussed herein. For example, the memory 330 may include RAM and/or cache of the processor 320. The memory 330 may also include one or more storage devices (e.g., hard drives, flash drives, computer readable media, etc.) either local or remote to the controller 310. The memory 330 is configured to store look up tables, algorithms, or instructions.

The controller 310 includes a pressure differential circuit 332. The pressure differential circuit 332 may be configured to interpret a first parameter indicative of a first pressure amount of the selective catalytic reduction system 202 measured by the first sensor (e.g., the first sensor 215). The first pressure amount may correspond to an inlet pressure amount. Alternatively or additionally, the first pressure amount may correspond to at least one of a first or second inlet pressure amount. To that end, the controller 310 may be configured, for each selective catalytic reduction system 205A,B, to interpret a first parameter indicative of a pressure amount of the respective selective catalytic reduction system (e.g., the selective catalytic reduction systems 205A,B) measured by the first sensor (e.g., the first sensors 255,275). In various embodiments, the first sensor 215, 255, 275 may include an electrical sensor (e.g., an exhaust pressure sensor) configured to receive and/or interpret a plurality of operating parameters (e.g., a pressure amount, pressure differential value, or a correction value) corresponding to each respective selective catalytic reduction system 202, 205A, 205b. For example, the first sensor 215 may be configured to interpret a first pressure amount corresponding to the selective catalytic reduction system 202.

Alternatively or additionally, the pressure differential circuit 332 may be configured to interpret a secondary parameter indicative of a secondary pressure amount of the selective catalytic reduction system 202 measured by the second sensor 225. In some embodiments, the controller 310 may be configured to interpret a secondary parameter indicative of a secondary pressure amount of each respective selective catalytic reduction system (e.g., the selective catalytic reduction systems 205A,B) measured by the second sensor (e.g., the second sensor 265,285). In various embodiments, the second sensor 225 may include an electrical sensor configured to receive and interpret one or more operating parameters corresponding to the selective catalytic reduction system (e.g., selective catalytic reduction systems 202, 205A, 205b). For example, the second sensor 225 may be configured to interpret a secondary pressure amount corresponding to the selective catalytic reduction system 202. In some example embodiments, the secondary pressure amount corresponds to an outlet pressure amount. Alternatively or additionally, the secondary pressure amount may correspond to at least one of a first or second outlet pressure amount. For example, the secondary pressure amount may correspond to the first outlet pressure amount associated with the first outlet 270 and/or the second outlet pressure amount associated with the second outlet 290.

Moreover, the plurality of operating parameters (e.g., a pressure amount, pressure differential value, correction value, etc.) may be determined based, at least in part, on the interpretation of the first parameter (e.g., a first pressure amount) and the secondary parameter (e.g., a secondary pressure amount). In some embodiments, the pressure differential circuit 332 may be configured to determine a plurality of operating parameters based, at least in part, on the interpretation of the first parameter and the secondary parameter with respect to each selective catalytic reduction system 205A,B.

The plurality of operating parameters can be used to determine a rate of exhaust flow, the difference in pressure across the plurality of selective catalytic reduction systems, and the correction factor with respect to each selective catalytic reduction system. Accordingly, the pressure differential circuit 332 may be configured to determine an exhaust flow value. The exhaust flow value may be indicative of an exhaust flow rate. The exhaust flow rate may be derived, measured, or otherwise calculated in various ways. In some embodiments, the exhaust flow rate may be derived via engine mapping based on speed, intake temp, intake pressure, fueling, and ambient conditions. Alternatively or additionally, the exhaust flow rate may be derived via physical sensors, volumetric efficiency calculations, etc. The pressure differential value (e.g., the pressure across a selective catalytic reduction system), in some embodiments, may be determined based, at least in part, on the first parameter and the secondary parameter. The pressure differential circuit 332 may provide the exhaust flow value and/or the pressure differential value to at least one of the correction circuit 334 or the plugged selective catalytic reduction circuit 336. An example process that may be utilized by the pressure differential circuit 332 is as follows:

Pressure differential value=first parameter−secondary parameter

The controller 310 further includes a correction circuit 334 configured to determine a correction factor based, at least in part, on the exhaust flow value and the pressure differential value. In some embodiments, the correction circuit 334 may be configured to determine a plurality of correction factors based, at least in part, on the plurality of exhaust flow values and the plurality of pressure differential values. The correction factor may be determined via a look-up table, an algorithm, or instructions configured to determine the correction factor. The correction circuit 334 may provide the correction factor to the plugged selective catalytic reduction circuit 336.

In further embodiments, the controller 310 includes a plugged selective catalytic reduction circuit 336 configured to determine a predetermined threshold value (e.g., the minimum value at which the exhaust flow rate corresponds to an unplugged selective catalytic reduction state) or a plurality of predetermined threshold values. The determination of the predetermined threshold value may be based, at least in part, on an engine parameter (e.g., the engine speed, engine load, etc.) and an exhaust flow value (e.g., the exhaust flow rate). In some embodiments, the predetermined threshold values may be determined with respect to each of the respective selective catalytic reduction systems (e.g., the selective catalytic reduction systems 205A,B).

In some embodiments, the plugged selective catalytic reduction circuit 336 may be configured to determine whether the predetermined threshold value exceeds the exhaust flow value. Alternatively or additionally, the plugged selective catalytic reduction circuit 336 may be configured to determine whether the plurality of predetermined threshold values exceeds the plurality of exhaust flow values. A predetermined threshold value may be in the range of a calibrateable floor to a calibrateable ceiling. For example, the predetermined threshold value may be set at 10 kPa for a first engine architecture and/or tuning while a secondary engine architecture and/or tuning may have a predetermined threshold value of 30 kPa. As will be appreciated by one of ordinary skill in the art, the range corresponding to the predetermined threshold value (e.g, the calibrateable floor to the calibrateable ceiling) may vary based, at least in part, on the respective engine architecture for operability according to various conditions. For values outside of the range corresponding to the predetermined threshold value, in some example embodiments, a selective catalytic reduction command (e.g., a fault code corresponding to a plugged or blocked SCR system) may be generated as described herein.

In some embodiments, the plugged selective catalytic reduction circuit 336 is configured to generate a selective catalytic reduction command (e.g., a fault code corresponding to a plugged or blocked SCR system). In further embodiments, the plugged selective catalytic reduction circuit 336 may be configured to generate a plurality of selective catalytic reduction commands for each respective selective catalytic reduction system (e.g., the selective catalytic reduction systems 205A,B). The selective catalytic reduction command may be generated based, at least in part, on the determination of the plurality of operating parameters (e.g., the exhaust flow value, pressure differential value, correction factor, etc.). Accordingly, the selective catalytic reduction command may cause an indication of the pressure differential corresponding to each of the respective selective catalytic reduction systems. The indication of the pressure differential corresponding to each of the respective selective catalytic reduction systems may be output, for example via a display (e.g., a liquid crystal display as described herein below), for communicating information to a user. In other embodiments, the indication of the pressure differential corresponding to each of the respective selective catalytic reduction systems may be transmitted, for example via telematics, to a remote location.

In further embodiments, the selective catalytic reduction command may be generated in response to a predetermined threshold value exceeding an exhaust flow value. For example, the plugged selective catalytic reduction circuit 336 may generate the selective catalytic reduction command when the predetermined threshold value is exceeded for a given exhaust flow rate which may be calibrated based, at least in part, on the respective engine architecture. In other embodiments, the plugged selective catalytic reduction circuit 336 may be configured to generate a plurality of selective catalytic reduction commands in response to the plurality of predetermined threshold values exceeding the plurality of exhaust flow values.

The plugged selective catalytic reduction circuit 336 may be configured to cause, via the selective catalytic reduction command, an indication of the pressure differential (e.g., the pressure across each respective selective catalytic reduction system) corresponding to a selective catalytic reduction system (e.g., the selective catalytic reduction system 202, 205A, and/or 205B). For example, the selective catalytic reduction command may cause an indication of a plugged selective catalytic reduction state (e.g., a state in which the pressure differential indicates the exhaust is not flowing in the selective catalytic reduction system or is flowing at a reduced or inhibited rate).

FIG. 4 is a flow diagram of an example process 400 for a controller to control improving a pressure differential determination corresponding to a selective catalytic reduction system via the circuit described herein with reference to FIG. 3. At 402, the process 400 includes interpreting a first parameter indicative of a first pressure amount of the selective catalytic reduction system measured by a first sensor. The first pressure amount may correspond to at least one of a first inlet pressure amount or second inlet pressure amount.

At 404, a secondary parameter indicative of a secondary pressure amount of the selective catalytic reduction system measured by a second sensor may be interpreted by a controller. The secondary pressure amount may correspond to at least one of a first outlet pressure amount or second outlet pressure amount.

At 406, the plurality of operating parameters may be determined by a controller. The plurality of operating parameters may be determined based, at least in part, on the interpretation of the first parameter (e.g., the first pressure amount) and the secondary parameter (e.g., the second pressure amount). In some embodiments, the plurality of operating parameters may be used to determine a rate of exhaust flow, a correction factor, and the difference in pressure (e.g., a pressure differential value) with respect to each selective catalytic reduction system. In further embodiments, a face plugging issue may be determined in response to the determination of the pressure differential value with respect to each selective catalytic reduction system. Alternatively or additionally, a missing aftertreatment component may be determined in response to the determination of the pressure differential value with respect to each selective catalytic reduction system.

At 408, a selective catalytic reduction command is generated by a controller. The selective catalytic reduction command may be generated based, at least in part, on the determination of the plurality of operating parameters. To that end, the selective catalytic reduction command may cause an indication of the pressure differential corresponding to each of the respective selective catalytic reduction systems. The indication of the pressure differential corresponding to each of the respective selective catalytic reduction systems may be output, for example via a display (e.g., a liquid crystal display as described herein below), for communicating information to a user. Alternatively or additionally, the indication of the pressure differential corresponding to each of the respective selective catalytic reduction systems may be transmitted, for example via telematics, to a remote location.

In some embodiments, the controller 120 or any of the controllers 210, 240, 310 described herein may comprise a system computer of an apparatus or system which includes the selective catalytic reduction system 202 or 205A,B. For example, FIG. 5 is a block diagram of a computing device 530 in accordance with an illustrative embodiment. The computing device 530 can be used to perform any of the methods or the processes described herein, for example the method 400. In some embodiments, the controller 120 can include the computing device 530. The computing device 530 includes a bus 532 or other communication component for communicating information. The computing device 530 can also include one or more processors 534 or processing circuits coupled to the bus for processing information.

The computing device 530 also includes main memory 535, such as a random access memory (RAM) or other dynamic storage device, coupled to the bus 532 for storing information, and instructions to be executed by the processor 534. Main memory 535 can also be used for storing position information, temporary variables, or other intermediate information during execution of instructions by the processor 534. The computing device 530 may further include ROM 538 or other static storage device coupled to the bus 532 for storing static information and instructions for the processor 534. A storage device 540, such as a solid-state device, magnetic disk or optical disk, is coupled to the bus 532 for persistently storing information and instructions. For example instructions for determining the first activation time, the first delivery time, the second insertion time and the second delivery time can be stored in the storage device.

The computing device 530 may be coupled via the bus 532 to a display 544, such as a liquid crystal display, or active matrix display, for displaying information to a user. An input device 542, such as a keyboard or alphanumeric pad, may be coupled to the bus 532 for communicating information and command selections to the processor 534. In another implementation, the input device 542 has a touch screen display 544.

According to various implementations, the processes and methods described herein can be implemented by the computing device 530 in response to the processor 534 executing an arrangement of instructions contained in main memory 535 (e.g., the operations of the method 400). Such instructions can be read into main memory 535 from another non-transitory computer-readable medium, such as the storage device 540. Execution of the arrangement of instructions contained in main memory 535 causes the computing device 530 to perform the illustrative processes described herein. One or more processors in a multi-processing arrangement may also be employed to execute the instructions contained in main memory 535. In alternative implementations, hardwired circuit may be used in place of or in combination with software instructions to effect illustrative implementations. Thus, implementations are not limited to any specific combination of hardware circuit and software.

Although an example computing device has been described in FIG. 5, embodiments described in this specification can be implemented in other types of digital electronic circuit, or in computer software embodied on a tangible medium, firmware, or hardware, including the structures disclosed in this specification and their structural equivalents, or in combinations of one or more of them. The subject matter described in this specification can be implemented as one or more computer programs, i.e., one or more circuit of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, flash drives, or other storage devices). Accordingly, the computer storage medium is both tangible and non-transitory.

The operations described in this specification can be performed by a data processing apparatus on data stored on one or more computer-readable storage devices or received from other sources.

The term "controller" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuit, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, sub programs, or portions of code).

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, the separation of various system components in the implementations described above should not be understood as requiring such separation in all implementations, and it should be understood that the described components and systems can generally be integrated in a single product or packaged into multiple products embodied on tangible media.

As utilized herein, the terms "approximately," "substantially", and similar terms are intended to have a broad meaning (e.g., in the range of "+" or "−" 5% of any identified value) in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein. No claim element herein is to be construed under the provisions of 35 U.S.C. § 112, sixth paragraph, unless the element is expressly recited using the phrase "means for."

The terms "coupled," "connected," and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. When the language "at least a portion" and/or "a portion" is used the item can include a portion and/or the entire item unless specifically stated to the contrary.

In the above description, certain terms may be used such as "up," "down," "upper," "lower," "top," "bottom," "upper," "lower," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise.

What is claimed is:

1. A system comprising:
   a first sensor coupled to an inlet of a selective catalytic reduction system;
   a second sensor coupled to an outlet of the selective catalytic reduction system; and
   a controller communicatively coupled to the selective catalytic reduction system, the controller configured to:
      determine a threshold value corresponding to a minimum value at which an exhaust flow rate corresponds to an unplugged selective catalytic reduction system state;
      interpret a first parameter indicative of a first pressure amount of the selective catalytic reduction system measured by the first sensor;
      interpret a secondary parameter indicative of a secondary pressure amount of the selective catalytic reduction system measured by the second sensor;
      determine a plurality of operating parameters based, at least in part, on the interpretation of the first parameter and the secondary parameter, the plurality of operating parameters comprising a pressure differential for the selective catalytic reduction system, calculated using the first parameter and the secondary parameter, and a corrected exhaust flow rate determined based on the pressure differential; and
      generate a selective catalytic reduction command based, at least in part, on the determination that the corrected exhaust flow rate is below the threshold value.

2. The system of claim 1, wherein the determination of the plurality of operating parameters comprises
   determining, via a look-up table, a correction factor for the corrected exhaust flow rate.

3. The system of claim 1, wherein the generation of the selective catalytic reduction command comprises
   determining the threshold value, based, at least in part, on an engine parameter.

4. The system of claim 1, wherein the first pressure amount corresponds to an inlet pressure amount of the selective catalytic reduction system.

5. The system of claim 1, wherein the secondary pressure amount corresponds to an outlet pressure amount of the selective catalytic reduction system.

6. A system comprising:
   a plurality of selective catalytic reduction systems, each of the plurality of selective catalytic reduction systems comprising:
      a first sensor coupled to an inlet of the respective selective catalytic reduction system, and
      a second sensor coupled to an outlet of the respective selective catalytic reduction system; and
   a controller communicatively coupled to the plurality of selective catalytic reduction systems, the controller configured to:
      determine a threshold value corresponding to a minimum value at which an exhaust flow rate corresponds to an unplugged selective catalytic reduction system state;
      for each selective catalytic reduction system, interpret a first parameter indicative of a pressure amount of the respective selective catalytic reduction system measured by the first sensor;
      interpret a secondary parameter indicative of a secondary pressure amount of the respective selective catalytic reduction system measured by the second sensor;
      determine a plurality of operating parameters based, at least in part, on the interpretation of the first parameter and the secondary parameter, the plurality of operating parameters comprising a pressure differential for the respective selective catalytic reduction system, calculated using the first parameter and the second parameter, and a corrected exhaust flow rate determined based on the pressure differential; and
      generate a plurality of selective catalytic reduction commands for each selective catalytic reduction system based, at least in part, on the determination that at least one of the corrected exhaust flow rate for the respective selective catalytic reduction system is below the threshold value.

7. The system of claim 6, wherein the determination of the plurality of operating parameters comprises
   determining a plurality of correction factors, each of the plurality of the correction factors corresponding to the corrected exhaust flow rate for the respective selective catalytic reduction system.

8. The system of claim 6, wherein the generation of the plurality of selective catalytic reduction commands comprises:
   determining a plurality of threshold values, based, at least in part, on a plurality of engine parameters.

9. The system of claim 6, wherein the pressure amount corresponds to at least one of a first or second inlet pressure amount of the respective selective catalytic reduction system.

10. The system of claim 6, wherein the secondary pressure amount corresponds to at least one of a first or second outlet pressure amount of the respective selective catalytic reduction system.

11. A method for improving a pressure differential determination corresponding to a selective catalytic reduction system, the method comprising:
   determining a threshold value corresponding to a minimum value at which an exhaust flow rate corresponds to an unplugged selective catalytic reduction system state;
   interpreting, via a controller, a first parameter indicative of a first pressure amount of the selective catalytic reduction system measured by a first sensor;
   interpreting, via the controller, a secondary parameter indicative of a secondary pressure amount of the selective catalytic reduction system measured by a second sensor;
   determining, via the controller, the plurality of operating parameters based, at least in part, on the interpretation of the first parameter and the secondary parameter, the plurality of operating parameters comprising a pressure differential for the selective catalytic reduction system, calculated using the first parameter and the second parameter, and a corrected exhaust flow rate determined based on the pressure differential; and
   generating, via the controller, a selective catalytic reduction command based, at least in part, on the determination that the corrected exhaust flow rate for the selective catalytic reduction system is below the threshold value, the selective catalytic reduction command causing an indication of the pressure differential corresponding to the selective catalytic reduction system.

12. The method of claim 11, wherein the determination of the plurality of operating parameters comprises
   determining a correction factor for the corrected exhaust flow rate for the selective catalytic reduction system.

13. The method of claim 12, further comprising determining a face plugging issue in response to the determination of the pressure differential value.

14. The method of claim 12, further comprising determining, based on the pressure differential value, & that the selective catalytic reduction system is missing.

15. The method of claim 11, wherein the generation of the selective catalytic reduction command comprises
   determining, via a look-up table, a correction factor for the corrected exhaust flow rate.

16. The method of claim 11, wherein the first pressure amount corresponds to an inlet pressure amount.

17. The method of claim 11, wherein the secondary pressure amount corresponds to an outlet pressure amount.

18. A non-transitory computer-readable medium storing instructions that, when executed by one or more processors, cause the one or more processors perform operations comprising:
   determining a threshold value corresponding to a minimum value at which an exhaust flow rate corresponds to an unplugged selective catalytic reduction system state;
   interpreting a first parameter indicative of a first pressure amount of the selective catalytic reduction system measured by a first sensor;
   interpreting a secondary parameter indicative of a secondary pressure amount of the selective catalytic reduction system measured by a second sensor;
   determining a plurality of operating parameters based, at least in part, on the interpretation of the first parameter and the secondary parameter, the plurality of operating parameters comprising a pressure differential for the selective catalytic reduction system, calculated using the first parameter and the second parameter, and a corrected exhaust flow rate determined based on the pressure differential; and
   generating a selective catalytic reduction command based, at least in part, on the determination that the corrected exhaust flow rate for the selective catalytic reduction system is below the threshold value, the selective catalytic reduction command causing an indication of the pressure differential corresponding to the selective catalytic reduction system.

19. The non-transitory computer-readable medium of claim 18, wherein the determination of the plurality of operating parameters comprises determining, via a look-up table, a correction factor for the corrected exhaust flow rate for the selective catalytic reduction system.

20. The non-transitory computer-readable medium of claim 18, wherein the generation of the selective catalytic reduction command comprises:
   determining, via a look-up table, the threshold value, based, at least in part, on an engine parameter.

21. The non-transitory computer-readable medium of claim 18, wherein the first pressure amount corresponds to an inlet pressure amount.

22. The non-transitory computer-readable medium of claim 18, wherein the secondary pressure amount corresponds to an outlet pressure amount.

* * * * *